United States Patent
Gilman et al.

(10) Patent No.: US 8,670,885 B2
(45) Date of Patent: Mar. 11, 2014

(54) INFORMATION DISPLAY SYSTEM AND METHOD

(75) Inventors: Dale Gilman, Beverly Hills, MI (US); Paul Aldighieri, Grosse Pointe Farms, MI (US); David L. Watson, Ann Arbor, MI (US); Angela L. Watson, Ann Arbor, MI (US); Craig Sandvig, Sterling Hts, MI (US); Leslie Bodnar, Dearborn, MI (US); Jeffrey Allen Greenberg, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 13/344,288

(22) Filed: Jan. 5, 2012

(65) Prior Publication Data

US 2012/0179318 A1    Jul. 12, 2012

Related U.S. Application Data

(60) Provisional application No. 61/430,349, filed on Jan. 6, 2011.

(51) Int. Cl.
*B60L 3/00* (2006.01)
(52) U.S. Cl.
USPC ..... 701/22; 340/988; 340/995.1; 340/995.14; 340/995.27; 340/425.5; 340/438; 340/455; 701/400; 701/408; 701/423
(58) Field of Classification Search
None
See application file for complete search history.

(56) References Cited

U.S. PATENT DOCUMENTS

| | | | | |
|---|---|---|---|---|
| 5,686,895 A | * | 11/1997 | Nakai et al. | 340/636.1 |
| 5,981,100 A | | 11/1999 | Rouhani | |
| 6,453,731 B1 | * | 9/2002 | Yaegashi | 73/114.52 |
| 8,521,408 B2 | * | 8/2013 | Cho et al. | 701/123 |
| 2002/0107635 A1 | * | 8/2002 | Katayama et al. | 701/207 |
| 2003/0006914 A1 | * | 1/2003 | Todoriki et al. | 340/995 |
| 2003/0137278 A1 | * | 7/2003 | Kondo | 320/132 |
| 2005/0128065 A1 | * | 6/2005 | Kolpasky et al. | 340/461 |
| 2009/0079263 A1 | * | 3/2009 | Crumm et al. | 307/43 |

(Continued)

OTHER PUBLICATIONS

Internal Search Report and Written Opinion of the International Searching Authority dated May 2, 2012 for PCT Application No. PCT/US12/20480 filed Jan. 6, 2012, pp. 1-9.

*Primary Examiner* — Jonathan M Dager
(74) *Attorney, Agent, or Firm* — Jennifer M. Stec; Brooks Kushman P.C.

(57) ABSTRACT

A vehicle display may convey vehicle trip information and vehicle range information graphically to assist drivers in qualitatively visualizing and determining whether they can successfully make it to their destination before an on-board energy source is depleted. A trip gauge may include indicators corresponding to the relative locations of the vehicle, the destination, and a projected zero charge location associated with the vehicle's range or distance to empty value. The positions of the indicators relative to one another may indicate whether the excess energy is available for the vehicle to reach the destination or whether the energy available is insufficient. A battery gauge may also convey information associated with the vehicle range. Portions of the trip gauge and the battery gauge, as well as one or more of the associated indicators, may assigned various color values for display based upon energy consumption, vehicle range, and target distance information.

20 Claims, 6 Drawing Sheets

(56) References Cited

U.S. PATENT DOCUMENTS

| | | |
|---|---|---|
| 2009/0112462 A1 | 4/2009 | Lo |
| 2009/0284363 A1 | 11/2009 | Havins |
| 2010/0010697 A1* | 1/2010 | Soma et al. .................. 701/22 |
| 2010/0094496 A1* | 4/2010 | Hershkovitz et al. .......... 701/22 |
| 2010/0106401 A1 | 4/2010 | Naito et al. |
| 2010/0121590 A1* | 5/2010 | Kato .............................. 702/63 |
| 2010/0138098 A1* | 6/2010 | Takahara et al. ............... 701/29 |
| 2010/0194553 A1* | 8/2010 | Mizutani et al. ............. 340/438 |
| 2011/0032110 A1* | 2/2011 | Taguchi ..................... 340/636.1 |
| 2011/0066310 A1* | 3/2011 | Sakai et al. .................... 701/22 |
| 2011/0077854 A1* | 3/2011 | Fushiki et al. ............... 701/201 |
| 2011/0224900 A1* | 9/2011 | Hiruta et al. ................. 701/201 |
| 2011/0225105 A1* | 9/2011 | Scholer et al. ............... 705/412 |
| 2011/0246061 A1* | 10/2011 | Hayashi ...................... 701/201 |
| 2011/0264317 A1* | 10/2011 | Druenert et al. .............. 701/22 |
| 2012/0032637 A1* | 2/2012 | Kotooka et al. .............. 320/109 |
| 2012/0116620 A1* | 5/2012 | Wang et al. .................... 701/22 |
| 2012/0176231 A1* | 7/2012 | Skaff et al. .................. 340/439 |
| 2012/0179314 A1* | 7/2012 | Gilman et al. ................. 701/22 |
| 2012/0179319 A1* | 7/2012 | Gilman et al. ................. 701/22 |
| 2012/0179395 A1* | 7/2012 | Gilman et al. ................. 702/61 |
| 2012/0179420 A1* | 7/2012 | Gilman et al. ............... 702/165 |
| 2013/0173101 A1* | 7/2013 | Gilman et al. ................. 701/22 |
| 2013/0345945 A1* | 12/2013 | Fischer et al. ............... 701/102 |

* cited by examiner

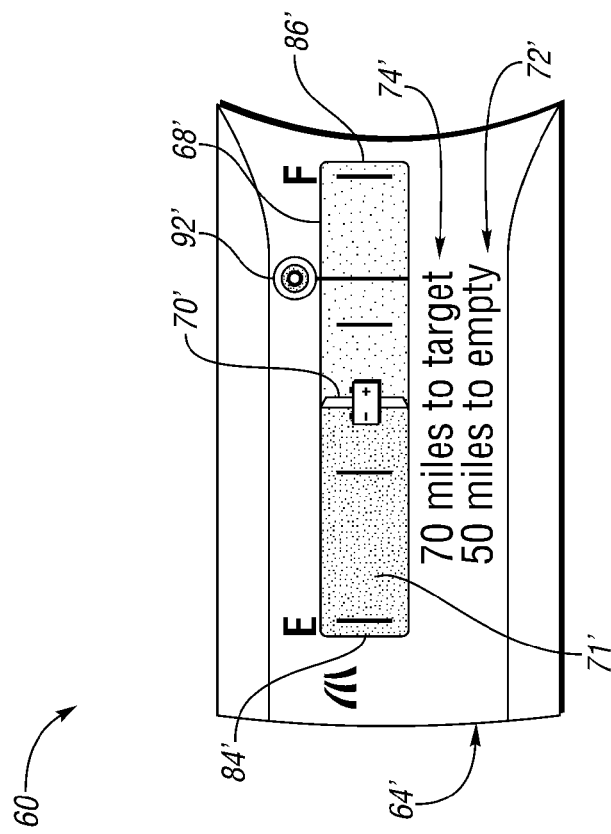
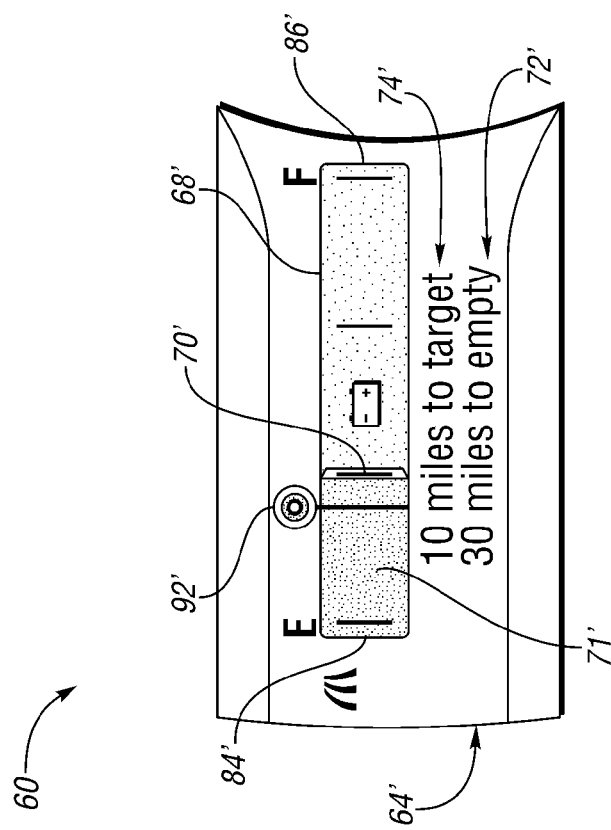

INFORMATION DISPLAY SYSTEM AND METHOD

CROSS-REFERENCE TO RELATED APPLICATIONS

This application claims the benefit of U.S. provisional Application No. 61/430,349 filed Jan. 6, 2011, the disclosure of which is incorporated in its entirety by reference herein.

TECHNICAL FIELD

The present application relates to an information display system and method for a vehicle for graphically displaying vehicle range and destination information relative to each other and the vehicle location.

BACKGROUND

Plug-in electric vehicle, including battery electric vehicles (BEVs) and plug-in hybrid electric vehicles (PHEVs), may be connected to an external power supply for charging a vehicle battery. Such vehicles typically include a charge cord that extends from an external power supply and is physically connected to a vehicle charging port to facilitate charging of the vehicle battery. The vehicle battery provides electrical power to operate a motor, which generates wheel torque for propelling the vehicle. When the battery charge is depleted, the vehicle may no longer be mobile, particularly with respect to BEVs. Economical driving choices can help extend the vehicle's range, particularly by reducing the rate at which the vehicle expends energy stored in the battery.

Vehicles include a number of interfaces, such as gauges, indicators, and/or displays to convey information to the driver regarding the vehicle and its surroundings. With the advent of new technologies, these interfaces have become more sophisticated. For example, some vehicles include battery state of charge gauges and vehicle range indicators. Also, many hybrid electric vehicles (HEVs) incorporate gauges that attempt to provide the driver with information on the various hybrid driving states. Some gauges will indicate to the driver when the vehicle is being propelled by an engine alone, a motor alone, or a combination of the two. Similarly, a display may indicate when the motor is operating as a generator, and is recharging an energy storage device, such as the battery. As new technologies increase in complexity, drivers rely on these interfaces to convey information that will help them make economical driving choices, enhance their driving experience, and safely reach their destination.

SUMMARY

According to one or more embodiments of the present application, a battery gauge for a vehicle may include a first end associated with a lower battery charge limit and a second end associated with an upper battery charge limit. The battery gauge may further include a state of charge (SOC) indicator disposed between the first end and the second end based on a battery SOC. The battery gauge may also include a target indicator associated with a target destination. The target indicator may be disposed between the first end and the second end based on a target distance. The target distance may correspond to a distance between the vehicle and the target destination. The position of the SOC indicator relative to the first end may correspond to an estimated vehicle range.

The position of the target indicator relative to the SOC indicator may indicate the target distance from a current vehicle location to the target destination. Alternatively, the position of the target indicator relative to the first end may indicate the target distance from a current vehicle location to the target destination. In general, the position of the target indicator relative to the SOC indicator and the first end may indicate whether the vehicle is currently able to reach the target destination based on the battery SOC. The target indicator may be disposed between the SOC indicator and the first end when the estimated vehicle range exceeds the target distance indicating surplus battery energy exists for the vehicle to reach the target destination under current operating conditions. The position of the target indicator relative to the SOC indicator may be indicative of a magnitude of the surplus battery energy. Moreover, the SOC indicator may be disposed between the first end and the target indicator when the target distance exceeds the estimated vehicle range indicating insufficient battery energy is available for the vehicle to reach the target destination under current operating conditions. The insufficient battery energy may correspond to an energy deficit. The position of the target indicator relative to the SOC indicator may be indicative of a magnitude of the energy deficit.

According to one or more additional embodiments, a display control system for a vehicle may include a display in communication with a controller. The display may include a battery gauge having a first end associated with a lower battery charge limit, a second end associated with an upper battery charge limit, and a state of charge (SOC) indicator associated with a battery SOC. The display may further include a target indicator associated with a target destination. The controller may be configured to calculate an estimated vehicle range based at least upon the battery SOC and calculate a target distance based on a current vehicle location and the target destination. The controller may be further configured to output a signal causing the display to adjust a position of the target indicator relative to the SOC indicator based on the estimated vehicle range and the target distance. The position of the target indicator relative to the SOC indicator may be indicative of the target distance from the current vehicle location to the target destination. Alternatively, the position of the target indicator relative to the first end may be indicative of the target distance from a current vehicle location to the target destination.

The target indicator may be disposed between the SOC indicator and the first end when the estimated vehicle range exceeds the target distance indicating surplus battery energy exists for the vehicle to reach the target destination under current operating conditions. The position of the target indicator relative to the SOC indicator may be indicative of a magnitude of the surplus battery energy. The SOC indicator may be disposed between the first end and the target indicator when the target distance exceeds the estimated vehicle range indicating insufficient battery energy is available for the vehicle to reach the target destination under current operating conditions. The insufficient battery energy may correspond to an energy deficit. The position of the target indicator relative to the SOC indicator may be indicative of a magnitude of the energy deficit.

In accordance with one or more embodiments of the present application, a display method may include calculating a target distance based upon a current vehicle location and a target destination and calculating an estimated vehicle range based upon a battery state of charge (SOC). The method may further include displaying a battery gauge including a first end associated with a lower battery charge limit, a second end associated with an upper battery charge limit, a state of charge (SOC) indicator associated with a battery SOC, and a target indicator associated with the target destination. The target indicator may be spaced apart from the SOC indicator based on the estimated vehicle range and the target distance. Moreover, the target indicator may be disposed between the SOC indicator and the first end when the estimated vehicle range exceeds the target distance indicating surplus battery energy exists for the vehicle to reach the target destination under current operating conditions. Further, the SOC indicator may be disposed between the first end and the target indicator when the target distance exceeds the estimated vehicle range indicating insufficient battery energy is available for the vehicle to reach the target destination under current operating conditions.

BRIEF DESCRIPTION OF THE DRAWINGS

FIG. 2b depicts an alternate view of the display in FIG. 2a;

FIG. 3b depicts an alternate view of the display in FIG. 3a;

FIG. 4b depicts an alternate view of the display in FIG. 4a;

FIG. 5b depicts an alternate view of the display in FIG. 5a;

FIG. 9a depicts yet another exemplary display in accordance with one or more embodiments of the present application; and FIG. 9b depicts an alternate view of the display in FIG. 9a.

DETAILED DESCRIPTION

As required, detailed embodiments of the present application are disclosed herein; however, it is to be understood that the disclosed embodiments are merely exemplary of an invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ one or more embodiments the present application.

Figure 1:
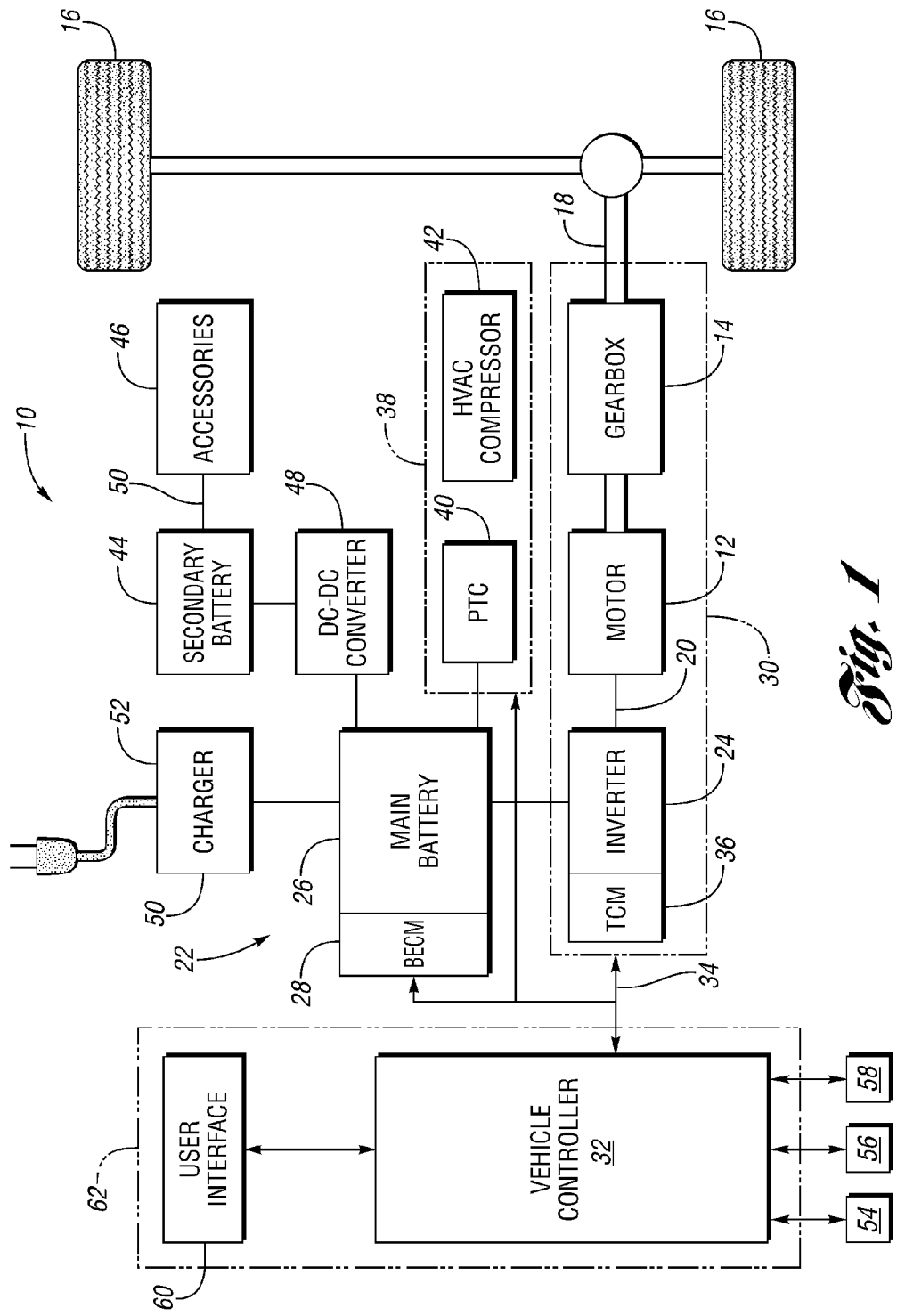
FIG. 1 is a simplified, exemplary schematic representation of a vehicle including a display control system in accordance with one or more embodiments of the present application.

Referring now to the drawings, FIG. 1 is a simplified, exemplary schematic diagram of a vehicle 10. The illustrated embodiment depicts the vehicle 10 as a battery electric vehicle (BEV), which is an all-electric vehicle propelled by one or more electric motors 12 without assistance from an internal combustion engine. The motor 12 may receive electrical power and provide mechanical rotational output power. The motor 12 may be mechanically connected to a gearbox 14 for adjusting the output torque and speed of the motor 12 by a predetermined gear ratio. The gearbox 14 may be connected to a set of drive wheels 16 by an output shaft 18. Other embodiments of the vehicle 10 may include multiple motors (not shown) for propelling the vehicle. The motor 12 may also function as a generator for converting mechanical power into electrical power. A high voltage bus 20 electrically connects the motor 12 to an energy storage system 22 through an inverter 24.

The energy storage system 22 may include a main battery 26 and a battery energy control module (BECM) 28. The main battery 26 may be a high voltage battery that is capable of outputting electrical power to operate the motor 12. According to one or more embodiments, the main battery 26 may be a battery pack made up of several battery modules. Each battery module may contain a plurality of battery cells. The battery cells may be air cooled using existing vehicle cabin air. The battery cells may also be heated or cooled using a battery thermal system, such as a fluid coolant system. The BECM 28 may act as a controller for the main battery 26. The BECM 28 may also include an electronic monitoring system that manages temperature and state of charge of each of the battery cells. Other embodiments of the vehicle 10 may utilize different types of energy storage systems, such as capacitors and fuel cells (not shown).

As shown in FIG. 1, the motor 12, the gearbox 14, and the inverter 24 may collectively be referred to as a transmission 30. To control the components of the transmission 30, a vehicle control system, shown generally as a vehicle controller 32, may be provided. Although it is shown as a single controller, the vehicle controller 32 may include multiple controllers that may be used to control multiple vehicle systems. For example, the vehicle controller 32 may be a vehicle system controller/powertrain control module (VSC/PCM). In this regard, the PCM portion of the VSC/PCM may be software embedded within the VSC/PCM, or it can be a separate hardware device. The vehicle controller 32 generally includes any number of microprocessors, ASICs, ICs, memory (e.g., FLASH, ROM, RAM, EPROM and/or EEPROM) and software code to co-act with one another to perform a series of operations. The vehicle controller 32 may communicate with other controllers (e.g., BECM 28) over a hardline vehicle connection 34 using a common bus protocol (e.g., CAN).

Just as the main battery 26 includes a BECM, other devices controlled by the vehicle controller 32 may have their own controllers or sub-controllers. For example, the transmission 30 may include a transmission control module (TCM) 36, configured to coordinate control of specific components within the transmission 30, such as the motor 12 and/or the inverter 24. The TCM 36 may communicate with the vehicle controller 32 over the CAN bus 34. The TCM 36 may include a motor controller for monitoring, among other things, the position, speed, power consumption and temperature of the motor 12. Using this information and a throttle command by the driver, the motor controller and the inverter 24 may convert the direct current (DC) voltage supply by the main battery 26 into signals that can be used to drive the motor 12. Some or all of these various controllers can make up a control system, which, for reference purposes, may be the vehicle controller 32. Although illustrated and described in the context of the vehicle 10, which is a BEV, it is understood that embodiments of the present application may be implemented on other types of vehicles, such as those powered by an internal combustion engine, either alone or in addition to one or more electric machines (e.g., HEVs, PHEVs, etc.).

The vehicle 10 may also include a climate control system 38 for heating and cooling various vehicle components. The climate control system 38 may include a high voltage positive temperature coefficient (PTC) electric heater 40 and a high voltage electric HVAC compressor 42. The PTC 40 may be used to heat coolant that circulates to a passenger car heater. Heat from the PTC 40 may also be circulated to the main battery 26. Both the PTC 40 and the HVAC compressor 42 may draw electrical energy directly from the main battery 26. The climate control system 38 may include a controller (not shown) for communicating with the vehicle controller 32 over the CAN bus 34. The on/off status of the climate control system 38 can be communicated to the vehicle controller 32, and can be based on, for example, the status of an operator actuated switch, or the automatic control of the climate control system 38 based on related functions such as window defrost.

In addition to the main battery 26, the vehicle 10 may include a separate, secondary battery 44, such as a typical 12-volt battery. The secondary battery 44 may be used to power various vehicle accessories, headlights, and the like (collectively referred to herein as accessories 46). A DC-to-DC converter 48 may be electrically interposed between the main battery 26 and the secondary battery 44. The DC-to-DC converter 48 may adjust, or "step down" the voltage level to allow the main battery 26 to charge the secondary battery 44. A low voltage bus 50 may electrically connect the DC-to-DC converter 48 to the secondary battery 44 and the accessories 46.

The vehicle 10 may further include an alternating current (AC) charger 52 for charging the main battery 26. The AC charger 52 may be connected to a charging port (not shown) for receiving AC power from an external power supply. The external power supply may include an adapter (e.g., a plug) for connecting to the charging port at the vehicle's exterior. The external power supply itself may be connected to an electrical power grid. The AC charger 52 may include power electronics used to convert, or "rectify" the AC power received from the external power supply to DC power for charging the main battery 26. The AC charger 52 may be configured to accommodate one or more conventional voltage sources from the external power supply (e.g., 110 volt, 220 volt, etc.).

Also shown in FIG. 1 are simplified schematic representations of a braking system 54, an acceleration system 56, and a navigation system 58. The braking system 54 may include a brake pedal, position sensors, pressure sensors, or some combination thereof, as well as a mechanical connection to the vehicle wheels, such as the primary drive wheels 16, to effect friction braking. The braking system 54 may also be configured for regenerative braking, wherein braking energy may be captured and stored as electrical energy in the main battery 26. The acceleration system 56 may include an accelerator pedal having one or more sensors, which, like the sensors in the braking system 54, may communicate information such as throttle input to the vehicle controller 32. The navigation system 58 may include a navigation display, a global positioning system (GPS) unit, a navigation controller and inputs for receiving destination information or other data from a driver. These components may be unique to the navigation system 58 or shared with other systems. The navigation system may also communicate distance and/or location information associated with the vehicle 10, its target destinations, charge point locations, or other relevant GPS waypoints. The vehicle controller 32 may communicate with each individual vehicle system to monitor and control vehicle operation according to programmed algorithms and control logic. In this regard, the vehicle controller 32 may help manage the different energy sources available and the mechanical power being delivered to the wheels 16 in order to maximize the vehicle's range.

In addition to the foregoing, the vehicle 10 may include a user interface 60 to facilitate communications with a driver. The user interface 60 may communicate with the vehicle controller 32 and may provide relevant vehicle content to a driver of the vehicle 10. The vehicle controller 32 may be configured to receive input signals that are indicative of current operating and environmental conditions of the vehicle 10. For instance, the vehicle controller 32 may receive input signals from the BECM 28, the transmission 30 (e.g., motor 12 and/or inverter 24), the climate control system 38, the braking system 54, the acceleration system 56, the navigation system 58, or the like. The vehicle controller 32 may provide output to the user interface 60 such that the user interface 60 conveys energy consumption and range information, or other information relating to the operation of the vehicle 10 to a driver. The vehicle controller 32 and the user interface 60 may form a control system 62 providing drivers with relevant vehicle operational and environmental content.

Referring generally to FIGS. 2a-5b, the user interface 60 is shown in greater detail in accordance with one or more embodiments of the present application. As seen therein, the user interface 60 may include at least one display 64 and associated circuitry, including hardware and/or software, necessary to communicate with the vehicle controller 32 and operate the display 64. The display 64 may be generally used to convey relevant vehicle content to a driver of the vehicle 10 including, for example, information relating to the operation of the vehicle 10 and/or the vehicle's range. The display 64 may be disposed within a dashboard (not shown) of the vehicle 10, such as in an instrument panel or center console area. Moreover, the display 64 may be part of another user interface system, such as the navigation system 58, or may be part of a dedicated information display system. The display 64 may be a liquid crystal display (LCD), a plasma display, an organic light emitting display (OLED), or any other suitable display. The display 64 may include a touch screen for receiving driver input associated with selected areas of the display. The user interface 60 or display 64 may also include one or more buttons (not shown), including hard keys or soft keys, for effectuating driver input.

Figure 2A:
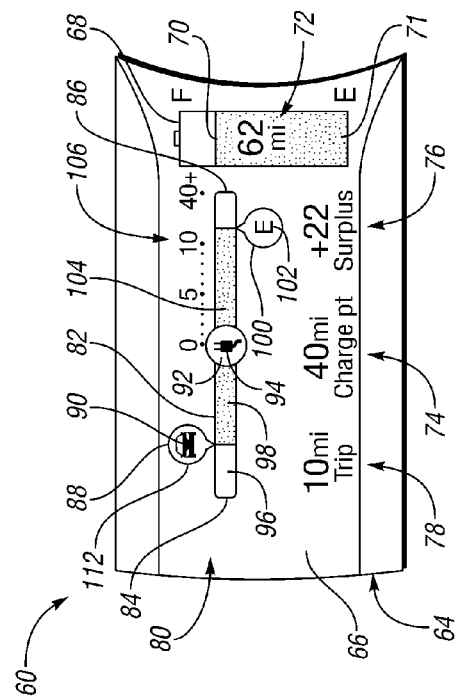
FIG. 2a depicts an exemplary display in accordance with one or more embodiments of the present application.
Figure 2B:
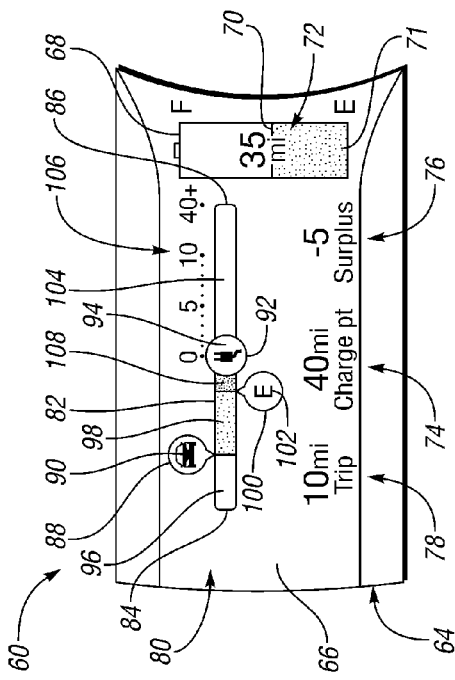

As shown in FIGS. 2a-b, the display 64 may include a debt/surplus view 66, which may convey range information associated with the vehicle 10. The debt/surplus view 66 may include a battery gauge 68 having a battery state of charge (SOC) indicator 70. The SOC indicator 70 may convey the relative amount of electrical energy remaining in the main battery 26. The battery gauge 68 may further include a SOC region 71 defined by the SOC indicator 70. BEVs may have a limited range or distance that can be traveled before the main battery 26 is depleted. Accordingly, the range of a vehicle may also be referred to as its distance to empty (DTE) value. To convey the DTE value, the battery gauge 68 may also include a DTE indicator 72. As shown in FIG. 2a-b, the DTE indicator 72 may be a digital data readout of the DTE value in units of distance (e.g., miles, kilometers, etc.) Alternatively, the DTE indicator 72 may be displayed elsewhere on the debt/surplus view 66. As the DTE value decreases, the SOC indicator 70 may move toward the "E" on the battery gauge 68. Correspondingly, the SOC region 71 may become smaller.

The manner in which the vehicle 10 is operated can be an important factor in determining how long the remaining charge in the main battery 26 is expected to last. For instance, aggressive driving behavior may deplete the main battery 26 more rapidly than relatively conservative driving behavior. To this end, the estimated vehicle range or DTE value may be based not only upon the amount of battery energy available in the main battery 26, but also upon an energy consumption profile. The energy consumption profile may correspond to an anticipated rate of energy consumption based on several factors. For example, the energy consumption profile may correspond to a theoretical or global average rate of energy consumption for all types of drivers. According to one or more embodiments, the energy consumption profile from which the DTE is estimated may correspond to an average rate of energy consumption for the vehicle 10 or one of the vehicle's drivers. For instance, each driver of the vehicle 10 may be assigned a key ID identifying themselves to the vehicle 10. This may allow driver preferences, settings or other profile information, such as an energy consumption profile, to be stored and recalled for each driver.

The key ID may be input to the vehicle either actively or passively at startup. For example, each driver may manually enter a code associated with their key ID. Alternatively, the key ID may be automatically transmitted to the vehicle 10 using radio frequency (RF) technology. In particular, the key ID may be an RFID stored in a driver's key or key fob that, when interrogated, transmits the driver's ID to the vehicle 10. Whether the energy consumption profile is associated with the vehicle 10 in general or an individual driver of the vehicle 10, the energy consumption profile may correspond to a lifetime average energy consumption rate or an average energy consumption rate for a past distance traveled, period of time or some other relevant event. The vehicle's estimate range may also factor in weather conditions, traffic conditions, information from the navigation system 58 (e.g., terrain, speed limits, traffic control elements, etc.), an instantaneous energy consumption rate, or the like. The operation of the vehicle 10 may be continuously monitored and analyzed in order to determine the impact of driving behavior on the vehicle's range. As described, the vehicle controller 32 may take into account past driving behavior, current driving behavior, and/or predicted future driving behavior when assessing the vehicle's range and constantly updating the estimated vehicle range or DTE value.

As mentioned previously, BEVs may have limited range; they may also have limited opportunities to recharge. In order to inform drivers whether they will be able to make it to their next charge point, the debt/surplus view 66 may also convey information corresponding to a target. The target may be a destination, either intermediate or final, such as a charging location. Moreover, the target may be designated by the navigation system 58 with or without driver input. Alternatively, the target information may correspond to a distance value input received by the vehicle controller 32, either directly or indirectly. Whether initially entered as a destination (e.g., navigation waypoint) or a distance, the target information may correspond to a current distance from the vehicle to the target, referred to as a target distance. Thus, in addition to the battery gauge 68, the debt/surplus view 66 may include a distance to target (DTT) 74 indicator corresponding to the current target distance. As previously mentioned, the target distance may correspond to the current distance from the vehicle 10 to a destination, such as the next charging location. Similar to the DTE indicator 72, the DTT indicator 74 may also be a digital data readout of the target distance value.

The user interface 60 may convey vehicle range information and target distance information to provide drivers with reassurance that they will be able to make it to their next charge point. If they are unable to reach their destination, the user interface 60 may also provide drivers plenty of warning so they can either modify their driving behavior in order to reach their target or change their target destination. When the target distance is less than the vehicle range (e.g., DTE value), the vehicle 10 may be considered to be operating with an energy surplus. Conversely, when the target distance exceeds the vehicle range, then the vehicle 10 may be considered to be operating with an energy deficit or "debt." Accordingly, the debt/surplus view 66 may further include a status indicator 76 to convey to a driver whether the vehicle 10 has sufficient electrical energy to reach its intended target. The status indicator 76 may also convey the magnitude or amount of the debt/surplus in units of distance. Like the DTE indicator 72 and the DTT indicator 74, the status indicator 76 may also be a digital data readout. As shown in FIG. 2a-b, the amount of the energy surplus (deficit) may be obtained by subtracting the current target distance value from the DTE value.

In addition to the DTE indicator 72 and the DTT indicator 74, the debt/surplus view 66 may include a trip distance indicator 78. The trip distance indicator 78 may correspond to a current trip distance. For example, the current trip distance may be the distance the vehicle has traveled since the start of a trip and may be associated with the odometer mileage between a trip start location and the current vehicle location. According to one or more embodiments, the trip start location may reset each time vehicle is started or may only be reset upon specific driver input.

In addition to being shown as digital data, vehicle trip information, range information and target information may also be conveyed graphically to provide a more qualitative visualization of the vehicle's location relative to a target location and an estimated empty or zero charge location. The zero charge location may correspond to an estimated location in which the energy available from the main battery 26 to propel the vehicle 10 will be depleted. Thus, the zero charge location may be based on the estimate of the DTE value. To this end, the debt/surplus view 66 may further include a trip gauge 80. The trip gauge 80 may graphically display the distance needed for the vehicle 10 to reach a designated charging location or some other target (e.g., the target distance) as well as an overlay of the expected range of the vehicle 10 relative to the target distance. As previously described, the difference between the target distance and the vehicle range may indicate whether the vehicle 10 has a surplus of charge in the main battery 26 (energy surplus) to make its destination, or rather a debt (energy deficit) indicating that the vehicle 10 is not projected to make it to the destination at the current energy consumption level. Moreover, the surplus (debt) may be expressed in units of distance. Accordingly, the trip gauge 80 may help inform drivers whether they are likely to reach their target destination or not so that driving behavior or, alternately, the target destination, can be modified accordingly.

With reference to FIGS. 2a-b, the trip gauge 80 may include a line or bar 82 having a first end 84 and a second end 86. The bar 82 may be straight, as shown, or may be variously-shaped. For example, the bar 82 may be arc-shaped or may comprise one or more line segments. The trip gauge 80 may convey distance as a linear scale. In this regard, the first end 84 may correspond to the trip start location. The trip gauge 80 may further include a vehicle indicator 88 corresponding to a current location of the vehicle 10 relative to the trip start location. Thus, the position of the vehicle indicator 88 relative to the first end 84 may correspond to the current trip distance. The vehicle indicator 88 may be a marker or some other element identifying and indicating the relative location of the vehicle 10 on the trip gauge 80. According to one or more embodiments, the vehicle indicator 88 may include a vehicle icon 90.

The trip gauge 80 may also include a target indicator 92 corresponding to a target location (e.g., charging location). The target indicator 92 relative to the first end 84 may correspond to an overall distance between the trip start location and the target location. Moreover, the target indicator 92 relative to the vehicle indicator 88 may correspond to the current target distance. Like the vehicle indicator 88, the target indicator 92 may be a marker or some other element identifying and indicating the relative location of the target destination. According to one or more embodiments, the target indicator 92 may include a plug icon 94 depicting the target as a charge point. Of course, alternate icons may be employed by the user interface 60 in connection with the vehicle indicator 88 and the target indicator 92 without departing from the scope of the present application. For instance, the target indicator 92 may include a bull's-eye, pin, flag, or the like suitable for indicating a target destination such as a designated charging location.

According to one or more embodiments of the present application, the target indicator 92 may be fixed at a particular position on the trip gauge 80 and the vehicle indicator 88 may move along the trip gauge 80 relative to the target indicator 92 and the trip start location based on the current trip distance and the current target distance. In the exemplary display 64 shown in FIGS. 2a-b, the current trip distance is 10 miles as conveyed by the trip distance indicator 78 and the current target distance is 40 miles as conveyed by the DTT indicator 74. Thus, the overall distance between the trip start location and the target location is 50 miles. The vehicle controller 32 may calculate the ratio of the trip distance to the overall distance when determining where to position the vehicle indicator 88 on the trip gauge 80. Accordingly, the vehicle indicator may be displayed approximately one-fifth ($1/5^{th}$) of the way between the first end 84 and the target indicator 92 (10 miles/50 miles=0.20). Of course, the positions of the elements of the trip gauge 80 may not necessarily be to scale. Instead, the vehicle indicator 88, for example, may only be displayed along the trip gauge 80 to convey an approximate or general relation of the vehicle location to the trip start location and/or the target location.

The trip gauge 80 may also include a trip distance region 96 associated with the current trip distance. Accordingly, the trip distance region 96 may correspond to the section of the trip gauge 80 between the first end 84 and the vehicle indicator 88. According to one or more embodiments of the present application, the trip distance region 96 may be used to convey a history of vehicle performance, such as its energy efficiency. For example, the trip distance region 96 may exhibit one color to convey periods of relatively efficient vehicle operation and another color to convey periods of relatively inefficient vehicle operation. Similar to the trip distance region 96, the trip gauge 80 may include a target distance region 98 associated with the current target distance. Accordingly, the target distance region 98 may correspond to the section of the trip gauge 80 between the vehicle indicator 88 and the target indicator 92.

According to one or more embodiments, the trip gauge may further include an empty indicator 100. The empty indicator 100 may be associated with the estimated empty or zero charge location based on the range of the vehicle 10 (e.g., the DTE value). Accordingly, the position of the empty indicator 100 relative to the vehicle indicator 88 may correspond to the DTE value and provide a relative indication of the vehicle's range. Moreover, the empty indicator 100 may convey the range of the vehicle 10 relative to the target distance. Like the vehicle indicator 88 and the target indicator 92, the empty indicator 100 may also be a marker or some other gauge element identifying and indicating the relative location of the zero charge location. According to one or more embodiments, the empty indicator 100 may include an "E" icon 102 symbolizing an empty energy storage device such as the main battery 26, though other icons, images or symbols may also be utilized.

As shown in FIG. 2a, the target indicator 92 may be disposed between the vehicle indicator 88 and the empty indicator 100 when the estimated vehicle range exceeds the current target distance. As a result, the exemplary display shown in FIG. 2a may indicate that a surplus of charge exists in the main battery 26 (e.g., an energy surplus) for the vehicle 10 to reach its target destination. Conversely, with reference to FIG. 2b, the empty indicator 100 may be disposed between the vehicle indicator 88 and the target indicator 92 when the current target distance exceeds the estimated vehicle range. Consequently, the exemplary display shown in FIG. 2b may indicate that there is insufficient energy available in the main battery 26 (e.g., an energy deficit or debt) for the vehicle to reach its target destination. Thus, the trip gauge 80 may visually convey whether the vehicle can successfully make it to its destination based on the position of the empty indicator 100 relative to the vehicle indicator 88 and the target indicator 92. As previously described, the energy surplus (debt) may be conveyed in terms of distance.

The trip gauge 80 may also help convey to a driver the relative importance of the displayed content at any given time. For example, near a start of a trip, a driver may see that the estimated zero charge location is fairly close to the target destination, but there may be a relatively long distance for the vehicle 10 to travel to reach the destination. Accordingly, the content of the display 64, in particular the trip gauge 80, may encourage the driver to carefully monitor the driving environment as well as his or her driving behavior during the trip to ensure that the target destination is successfully reached. On the other hand, a situation may occur where the target distance is relatively small and the battery energy available is relatively large. For example, the vehicle 10 may only have 5 miles to go to reach the destination, but 25 miles worth of additional charge in the main battery 26 (i.e., DTE=25 miles). In such situations, the trip gauge 80 may convey to a driver that there is little risk that the vehicle 10 will not make it to the target destination based on the relative locations of the vehicle indicator 88, target indicator 92 and empty indicator 100.

As previously described, the target indicator 92 may be fixed anywhere along the trip gauge 80. According to one or more embodiments, the target indicator 92 may be fixed on the trip gauge 80 approximately midway between the first end 84 and the second end 86, as shown in FIGS. 2a-b. In this manner, trip gauge 80 may further include a surplus region 104 corresponding to the portion of the trip gauge 80 between the target indicator 92 and the second end 86. Moreover, a surplus scale 106 may be associated with the surplus region 104. Accordingly, the trip gauge 80 may convey when an energy surplus exists as well as delineate the actual or relative magnitude of the energy surplus when the empty indicator 100 is disposed in the surplus region 104. In the example shown in FIG. 2a, the vehicle range is 62 miles and the target distance is 40 miles. Thus, the energy surplus is 22 miles (62−40=22). As a result, the empty indicator 100 may be disposed in the surplus region 104 adjacent a corresponding portion of the surplus scale 106 indicating the estimated 22 miles of additional battery charge beyond the target. The surplus scale 106 may linear, non-linear, or include portions of both. If the energy surplus exceeds the limits of the surplus scale 106, the empty indicator 100 may be displayed all the way at the second end 86, or may not be displayed on the trip gauge 80 at all.

In the example shown in FIG. 2b, the vehicle range is 35 miles and the target distance is 40 miles. Accordingly, the energy surplus is negative five miles (35−40=−5) or, stated differently, the energy deficit is 5 miles. Consequently, the empty indicator 100 is disposed between the vehicle indicator 88 and the target indicator 92. When this occurs, the region between the empty indicator 100 and the target indicator 92 may correspond to a debt region 108. The relative position of the empty indicator 100 between the vehicle indicator 88 and the target indicator 92 may indicate the relative magnitude of the energy deficit and, in turn, the size of the debt region 108.

Figure 3A:
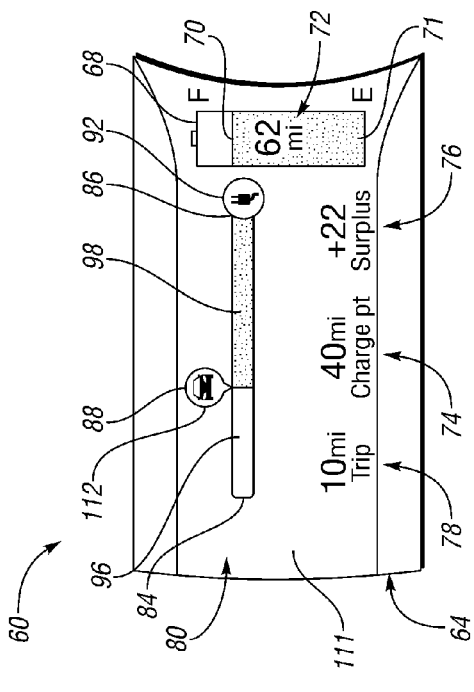
FIG. 3a depicts an exemplary display in accordance with one or more embodiments of the present application.
Figure 3B:
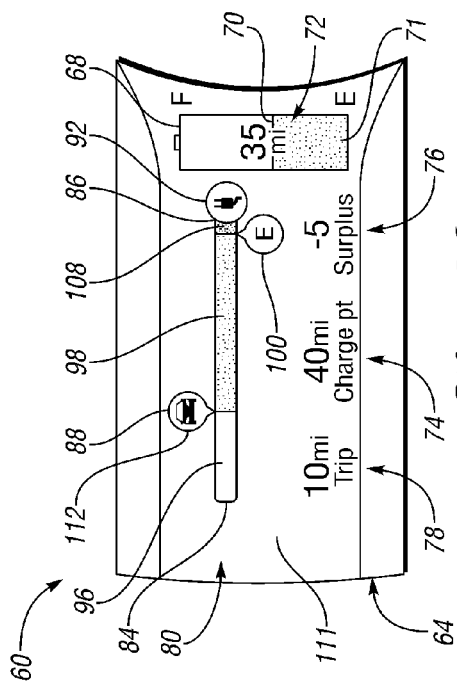

Variations to the trip gauge 80 can be made to emphasize different pieces of information. For instance, as shown in FIGS. 3a-b, the display 64 may include a range view 111. In the range view 111, the target indicator 92 may be fixed at the second end 86 of the trip gauge 80, with the empty indicator 100 displayed only if the zero charge location is located before the target destination indicating an energy deficit. In this manner, the trip gauge 80 may convey the projected failure to reach a target destination more prominently.

Figure 4A:
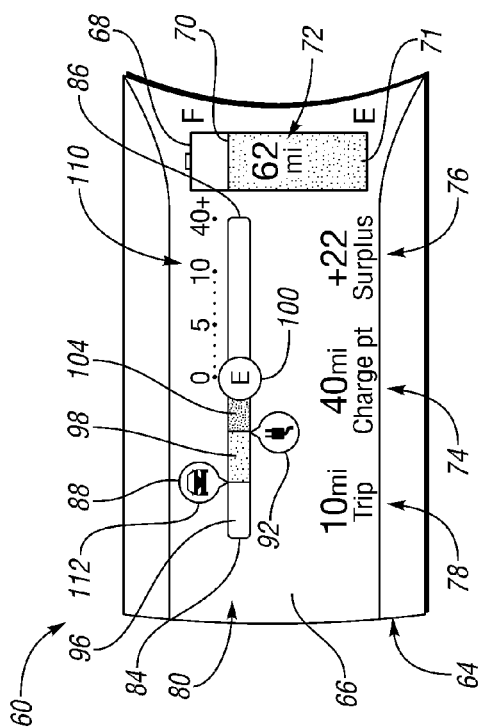
FIG. 4a depicts another exemplary display in accordance with one or more embodiments of the present application.
Figure 4B:
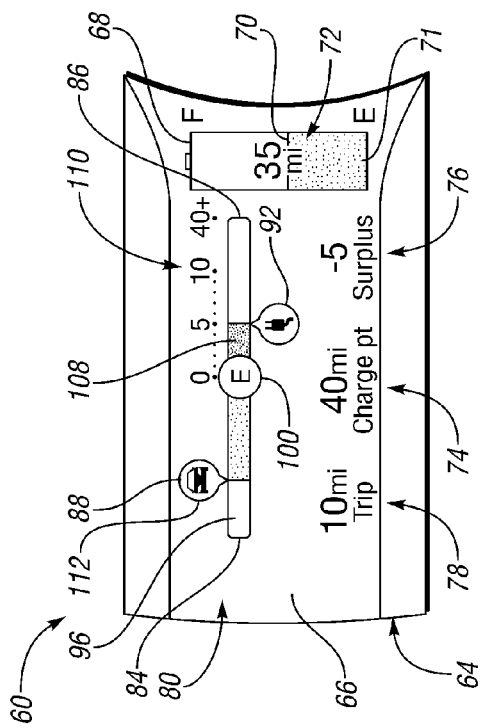
Figure 5A:
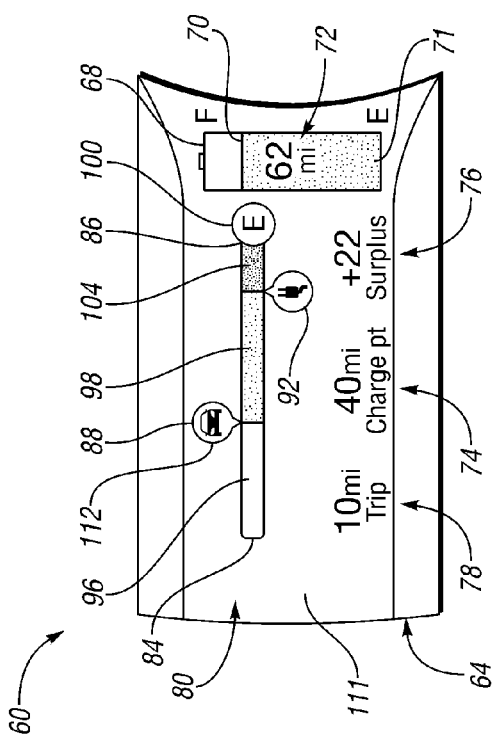
FIG. 5a depicts yet another exemplary display in accordance with one or more embodiments of the present application.
Figure 5B:
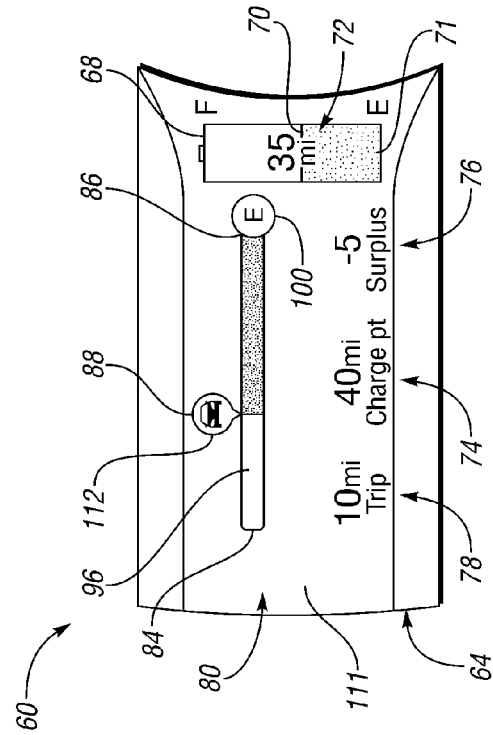

According to one or more additional embodiments, the empty indicator 100 may be fixed on the trip gauge 80 while the vehicle indicator 88 and the target indicator 92 move along the trip gauge 80 relative to the empty indicator 100. In this manner, the trip gauge 80 may emphasize the remaining distance to the zero charge location and/or the target destination, perhaps while deemphasizing the distance already traveled (e.g., the current trip distance). For example, with reference to FIGS. 4a-b, the empty indicator 100 may be fixed somewhere between the first end 84 and the second end 86 of the trip gauge 80. In this embodiment, rather than a surplus scale 106, the trip gauge 80 may include a debt scale 110 for more accurately conveying the magnitude of an energy deficit, should it exist, as illustrated in FIG. 4b in particular. As another example, with reference to FIGS. 5a-b, the empty indicator 100 may be fixed at the second end 86 of the trip gauge 80. Moreover, the target indicator 92 may only be displayed if the target destination is located before the zero charge location indicating an energy surplus. In this manner, the trip gauge 80 may convey the projected success in reaching a target destination more prominently.

The display 64 may be updated to reflect any ongoing changes to the vehicle or system state. For example, if a driver takes a detour to the target from an expected or programmed route, the vehicle 10 may communicate with the navigation system 58 to determine a new target distance. In addition, updates to the estimated vehicle range (e.g., DTE value) may be communicated to the user interface 60, and subsequently conveyed to a driver, in real-time. In this manner, the vehicle controller 32 may receive input from one or more of the BECM 28, transmission 30, climate system 38, breaking system 54, acceleration system 56, navigation system 58 and the like corresponding to information associated with the content displayed by the display 64. Using this input, the vehicle controller 32 may determine, calculate and/or estimate trip distance values, target distance values, vehicle range values, or the like. Additionally, the vehicle controller 32 may determine whether vehicle 10 has either an energy surplus or an energy deficit based on a comparison of the estimated vehicle range and the current target distance. Moreover, the vehicle controller 32 may calculate the difference between the estimated vehicle range and the current target distance to determine the magnitude of an energy surplus or deficit. Further, the vehicle controller 32 may transmit or output signals causing the display 64 to adjust the position of the vehicle indicator 88, target indicator 92, and/or empty indicator 100 based at least upon the current trip distance, the current target distance, and the estimated vehicle range, respectively.

When no target information is provided, the vehicle 10 may predict a target distance based on past driving history, such as average trip distance or some other available metric. Alternatively, if a target distance or destination is not entered by a driver or is otherwise unavailable, a budget distance may be generated. According to one or more embodiments, the estimated DTE value at that time may be used as an initial substitute value for the budget distance. Moreover, the current budget distance may be obtained by counting down from the initial DTE estimate based on the actual distance traveled (e.g., odometer mileage) since the initial DTE estimate was established. When using a DTE estimate as a default substitute value when a target distance/location is not entered or becomes unavailable, the trip gauge 80 may help coach drivers to at least obtain the initially estimated DTE. Since the estimated vehicle range or DTE value may be based on an energy consumption profile for a driver, the trip gauge 80 may provide an indication of the driver's current driving behavior against himself or herself. When no target information is available, the debt/surplus view 66 may not be available for display by the display 64. Rather, the range view 111 may be displayed. Further, the trip gauge 80 may not include the target indicator 92 and the empty indicator 100 may be fixed at the second end 86, as shown in the exemplary display 64 depicted in FIG. 5b.

Moreover, the labels on the DTT indicator 74 and the status indicator 76 may change when no target information is provided to reflect the difference in the information being conveyed. For example, the label for the DTT indicator 74 may switch from "charge point" or a similar term to "budget" or another similar term. Thus, the value associated with the DTT indicator 74 may correspond to the current budget distance. Similarly, the label for the status indicator 76 may switch from "surplus" or a similar term to "status" or another similar term. The value associated with the status indicator 76 may correspond to the difference between the DTE value and the budget distance. Moreover, the trip distance indicator 78 may not be displayed when target information is unavailable.

The display 64 may also convey vehicle range and/or surplus information using color schemes. In particular, one or more of the various display indicators and/or gauge regions may change color based upon the DTE value, the surplus amount, or both. According to one or more embodiments of the present application, the SOC region 71 may have a different color fill based upon the DTE value. For instance, the SOC region 71 may be displayed in a first color (e.g., blue) when the DTE value is above a DTE threshold ($DTE_{thr}$). The DTE threshold may correspond to a DTE value at which low vehicle range warnings may be triggered. In this regard, the SOC region 71 may change colors when the DTE value is below the DTE threshold to provide drivers with a warning of the relatively low vehicle range. If the DTE value is below the DTE threshold, but is greater than zero, the SOC region 71 may be displayed in a second color (e.g., yellow). Once the DTE value reaches zero, indicating that the main battery 26 has insufficient charge to propel the vehicle 10 any farther, the SOC region 71 may be displayed in a third color (e.g., red). As the SOC region 71 may be relatively small when the DTE value is zero, a nominal SOC region and/or the indicator may be displayed in the third color to further convey that the zero charge point has been reached. According to one or more embodiments of the present application, the DTE threshold may be a customer selectable distance value (e.g., 5, 10 or 15 miles). Further, coloring associated with the empty indicator 100 on the trip gauge 80 may also be based on the DTE value. For instance, the empty indicator 100 may be assigned the same color as the SOC region 71.

Figure 6:
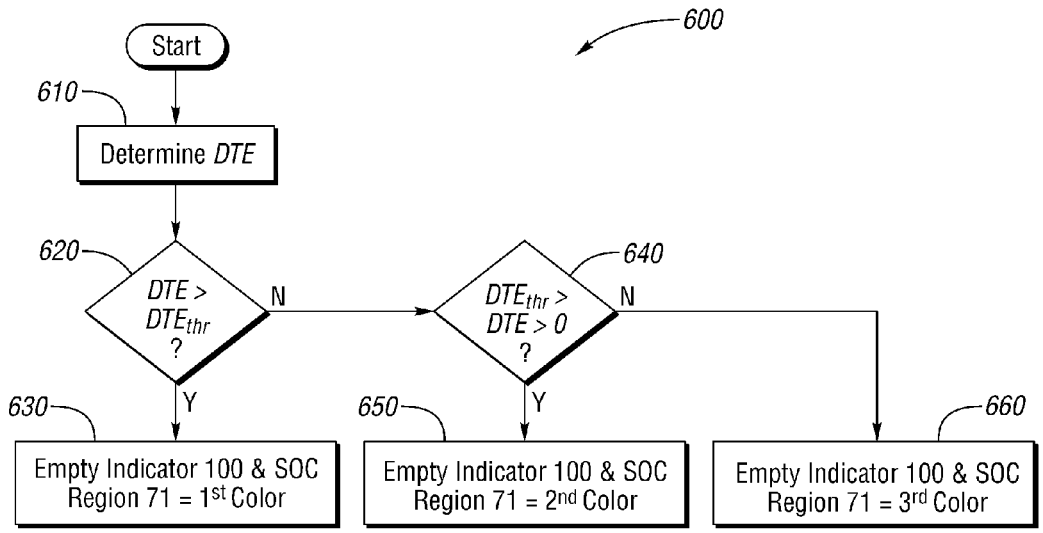
FIG. 6 is a simplified, exemplary flow diagram depicting a method for conveying vehicle range information using colors in accordance with one or more embodiments of the present application.

FIG. 6 depicts a simplified, exemplary flowchart 600 of a method for conveying range information using colors in accordance with one or more embodiments of the present application. At step 610, the system 62 may determine the DTE value (DTE). The DTE value may correspond to the DTE value displayed by the DTE indicator 72. At step 620, the system may compare the DTE value to the DTE threshold ($DTE_{thr}$). If the DTE value is greater than the DTE threshold, then at least the SOC region 71 and/or the empty indicator 100 may be displayed using the first color (e.g., blue), as described above and shown at step 630. If, however, the DTE value is not above the DTE threshold, the method may proceed to step 640. At step 640, the system may next determine whether the DTE value is above zero. If the DTE value is below the DTE threshold but above zero, then at least the SOC region 71 and/or the empty indicator 100 may be displayed using the second color (e.g., yellow), as described above and shown at step 650. Otherwise, the method may proceed to step 660. At step 660, at least the SOC region 71 and/or the empty indicator 100 may be displayed using the third color (e.g., red), as described above. Although exemplary colors are described herein, the first, second and third colors may be any three colors that may be distinguished from each other.

According to one or more additional embodiments, the status indicator 76 and the target indicator 92 may also convey vehicle range and/or surplus information using color schemes. Further, the target distance region 98, the surplus region 104 and/or the debt region 108, to the extent they are being displayed in a given view of the display 64, may also be associated with or otherwise displayed using different colors based on the current range and/or surplus conditions of the vehicle 10. When the surplus is positive, the select display elements may be displayed according to a first color scheme or state. For example, if the vehicle 10 is operating with a positive surplus (or status, if no charge point information is entered), the status indicator 76, the target indicator 92, the target distance region 98 and/or the surplus region 104 may all be displayed using the first color. If the vehicle 10 is operating with a negative surplus (or debt) and the DTE value is above the DTE threshold, then select display elements may be displayed according to a second color scheme or state. For example, the status indicator 76, the target indicator 92, and the debt region 108 may be displayed using the second color. The target distance region 98 may continue to be displayed according to the first color. If the surplus is negative and the DTE value is below the DTE threshold, then select display elements may be displayed according to a third color scheme or state. For example, the status indicator 76, the target indicator 92, and the debt region 108 may be displayed using the third color. The target distance region 98 may continue to be displayed according to the first color.

Figure 7:
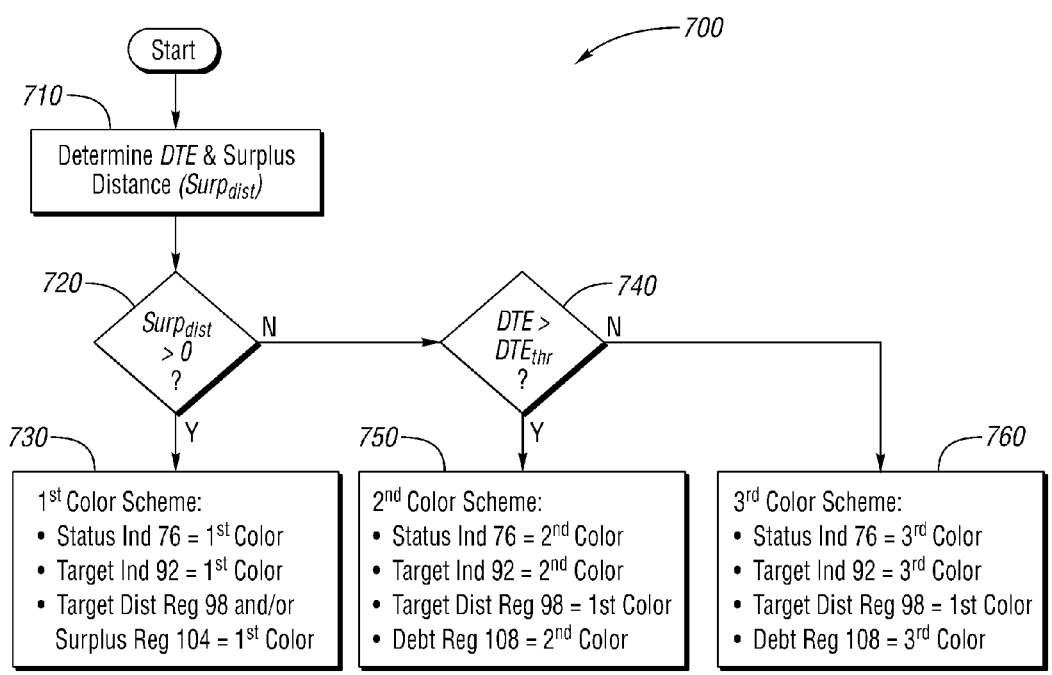
FIG. 7 is a simplified, exemplary flow diagram depicting a method for conveying vehicle range and energy surplus information using colors in accordance with one or more embodiments of the present application.

FIG. 7 depicts a simplified, exemplary flowchart 700 of a method for conveying range and surplus information using colors in accordance with one or more embodiments of the present application. At step 710, the system may determine the DTE value (DTE) and the surplus distance ($Surp_{dist}$). As previously described, the surplus distance may be the difference between the DTE value and the target distance. Accordingly, the surplus distance may be obtained by subtracting the value displayed by the DTT indicator 74 from the value displayed by the DTE indicator 72. If no charge point information is entered, the surplus distance may correspond to the difference between the DTE value and the current budget distance. At step 720, the system may determine whether the vehicle is operating with a positive energy surplus or a negative energy surplus (debt). Thus, the system may determine whether the surplus distance is positive. If the surplus distance is positive, the method may proceed to step 730. At step 730, the system may output select display elements according to the first color scheme. For example, the status indicator 76, the target indicator 92, the target distance region 98 and/or the surplus region 104 may all be displayed using the first color. If, on the other hand, the surplus distance is negative, the method may proceed to step 740. At step 740, the system may determine whether the DTE value is above the DTE threshold ($DTE_{thr}$). If the DTE value is above the DTE threshold, the method may proceed to step 750. At step 750, the system may output select display elements according to the second color scheme. For example, the status indicator 76, the target indicator 92, and the debt region 108 may be displayed using the second color. The target distance region 98 may continue to be displayed according to the first color. If at step 740, however, the DTE value is below the DTE threshold, the method may proceed to step 760. At step 760, the system may output select display elements according to the third color scheme. For example, the status indicator 76, the target indicator 92, and the debt region 108 may be displayed using the third color. The target distance region 98 may continue to be displayed according to the first color.

When no charge point information is available, the coloring strategy and associated algorithm for the one or more indicators and/or regions may vary. For instance, the region on the trip gauge 80 between the vehicle indicator 88 and the empty indicator 100 may always be displayed using the same color. Moreover, when the status indicator value associated with the status indicator 76 is positive, the status indicator may be displayed using the first color (e.g., blue). When the status indicator value associated with the status indicator 76 is negative, the status indicator may be displayed using a fourth color (e.g., white).

A display of the current estimated vehicle range and the needed range to reach a target destination, such as a charging location, which also takes into account instantaneous vehicle efficiency, may allow a driver to monitor whether his or her current energy demand is sustainable. As previously mentioned, drivers want to be reassured that they will be able to reach their target before the main battery 26 is depleted. Drivers also want to receive sufficient warning if their current vehicle operating behavior is consuming more energy than they can afford to expend in order to reach the target. In order to alleviate this range anxiety, the trip gauge 80 may also include energy budget information. The energy budget may incorporate information about the range of the vehicle 10 (e.g., DTE) as well as the target distance and be represented as a budget threshold.

The instantaneous efficiency may be conveyed in units of energy per unit distance (e.g., watt-hours per mile) to reflect an instantaneous energy consumption rate. The current capacity of the main battery 26 may be provided in units of energy (e.g., watt-hours). The target distance may, of course, be available in units of distance (e.g., miles). According to one or more embodiments of the present application, the energy budget threshold may be calculated by dividing the current main battery capacity by the current target distance. Any efficiency values below the calculated budget threshold may be indicative of a sustainable energy demand. Moreover, such efficiency values below the budget threshold may cause an increase in the energy surplus, while values above the budget threshold may decrease the energy surplus.

The budget threshold may increase as the ratio between the main battery capacity and the target distance increases. Conversely, the budget threshold may decrease as the ratio between the main battery capacity and the target distance decreases. One or more of the display indicators or regions on the trip gauge 80 may be shown as a sequence of color changes (or as a sequence of circular rings, arrows, etc.) consistent with gain/loss of energy surplus based on the instantaneous efficiency relative to the budget threshold. Because the instantaneous efficiency may be related to the projected distance to empty, this display can be normalized relative the current situation. For example, an instantaneous efficiency or trip gauge could show a positive indictor when the driver was going to increase the energy surplus and a negative indicator when the driver was decreasing the surplus (or increasing the debt). This may tie together the current driving behavior with the long term predictions of making or not making it to the destination.

As previously described, the effect of the instantaneous energy consumption rate on the energy surplus may be conveyed via one or more of the display indicators or regions. For instance, color changes may be applied to one or more of the display indicators or regions. Additionally or alternatively, additional elements may appear on the display to convey instantaneous vehicle efficiency information. Such additional elements may be associated with the one or more indicators or regions described above, such as halos or chevrons. The impact of the instantaneous energy consumption rate on the current debt/surplus may be expressed as an instantaneous debt/surplus value ($D/S_{inst}$). The instantaneous debt/surplus may be calculated based on the instantaneous energy consumption rate and the budget threshold. As previously described, the budget threshold may correspond to the consumption that may occur in order to still reach the target destination. The instantaneous debt/surplus may be the difference between the instantaneous energy consumption rate and the budget threshold. In this regard, a negative instantaneous debt/surplus value may be indicative of an increasing energy surplus. Conversely, a positive instantaneous debt/surplus value may be indicative of a decreasing energy surplus (or increasing debt).

Various indicator color states or intensities may be output by the display based on the instantaneous debt/surplus. For example, the vehicle indicator 88 may be displayed with varying color states and effects based on the instantaneous debt/surplus value. According to one or more embodiments, the color fill of the vehicle indicator 88 may change based upon the instantaneous debt/surplus value. Additionally or alternatively, a ring or halo may be displayed around the vehicle indicator 88 based upon the instantaneous debt/surplus value. Moreover, the size, color and/or intensity of the halo may vary based upon the instantaneous debt/surplus value. According to one or more embodiments, the vehicle indicator 88 may be displayed in five different color states based upon the instantaneous debt/surplus value. Each color state may correspond to a different range of instantaneous debt/surplus values as shown in Table 1 below:

TABLE 1

| $D/S_{inst}$ (Wh/mi) | $<D/S_{1st\_inst\_thr}$ (e.g., −40) | $>D/S_{1st\_inst\_thr}$, $<D/S_{2nd\_inst\_thr}$ (e.g., −40 to −21) | $>D/S_{2nd\_inst\_thr}$ $<D/S_{3rd\_inst\_thr}$ (e.g., −21 to +21) | $>D/S_{3rd\_inst\_thr}$ $<D/S_{4th\_inst\_thr}$ (e.g., +21 to +40) | $>D/S_{4th\_inst\_thr}$ (e.g., +40) |
|---|---|---|---|---|---|
| Level | Surplus Increasing Level 2 | Surplus Increasing Level 1 | Nominal | Debt Increasing Level 1 | Debt Increasing Level 2 |
| Indicator Color State | $1^{st}$ | $2^{nd}$ | $3^{rd}$ | $4^{th}$ | $5^{th}$ |

Figure 8:
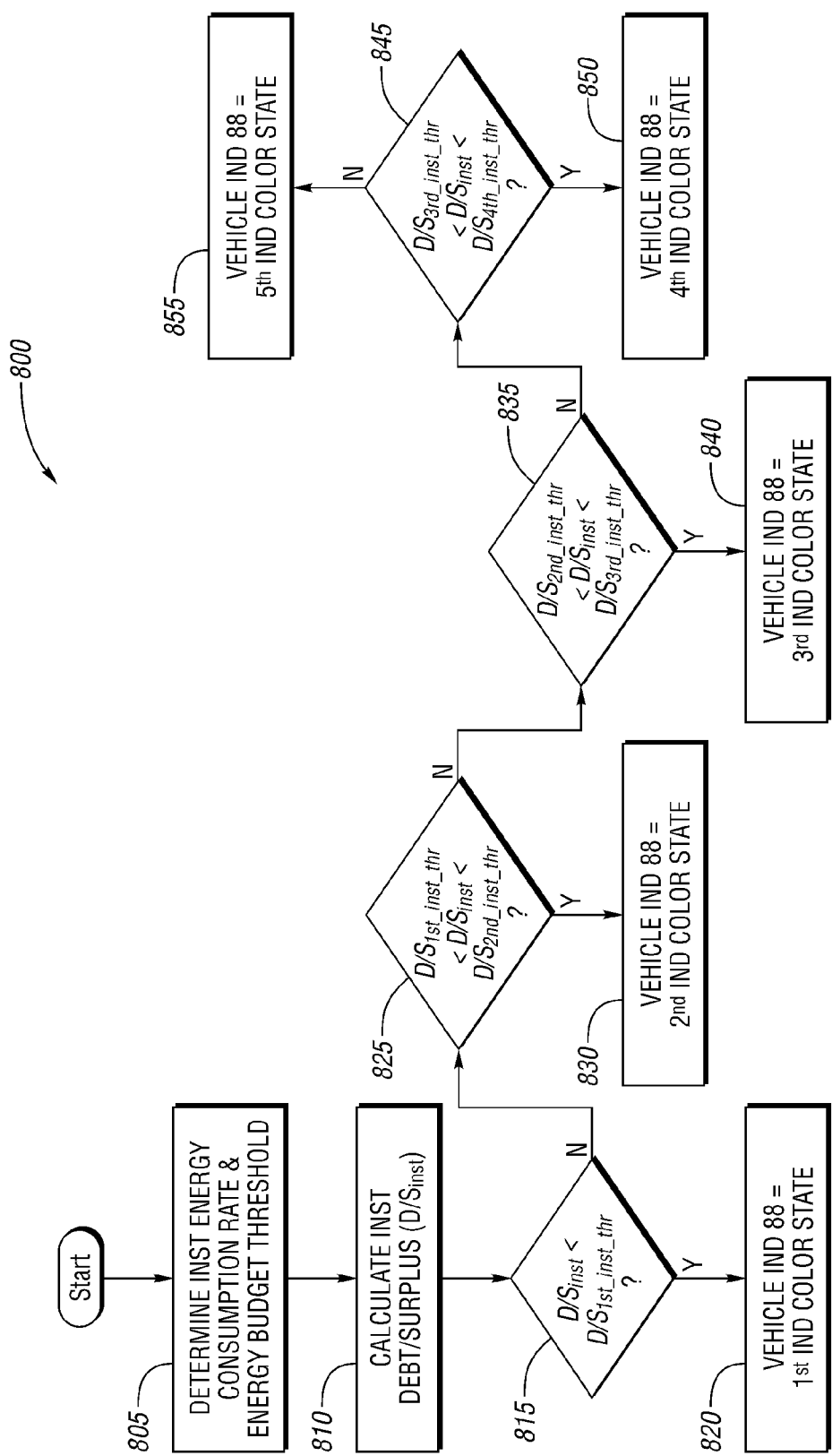
FIG. 8 is a simplified, exemplary flow diagram depicting a method for conveying the instantaneous energy consumption information in accordance with one or more embodiments of the present application.

FIG. 8 is a simplified, exemplary flowchart 800 of a method for conveying the instantaneous energy consumption information via the display 64 in accordance with one or more embodiments of the present application. At step 805, the system may calculate or otherwise determine the instantaneous energy consumption rate and the energy budget threshold. At step 810, the system may calculate the instantaneous debt/surplus value ($D/S_{inst}$) from the instantaneous energy consumption rate and the energy budget threshold. At step 815, the instantaneous debt/surplus value may be compared to a first instantaneous debt/surplus threshold ($D/S_{1st\_inst\_thr}$). The first instantaneous debt/surplus threshold may be a negative value (e.g., −40 Wh/mi) indicative of an instantaneous consumption rate that is much less than the budget threshold. If the instantaneous debt/surplus value is less than the first instantaneous debt/surplus threshold, then the method may proceed to step 820. At step 820, the vehicle indicator 88 may be displayed according to a first color state. If, however, the instantaneous debt/surplus value is not less than the first instantaneous debt/surplus threshold, the method may proceed to step 825. At step 825, the instantaneous debt/surplus value may be compared to a second instantaneous debt/surplus threshold ($D/S_{2nd\_inst\_thr}$). The second instantaneous debt/surplus threshold may be a negative value (e.g., −21 Wh/mi) indicative of an instantaneous consumption rate that is less than the budget threshold, but not by as much as the first instantaneous debt/surplus threshold. If the instantaneous debt/surplus value is between the first instantaneous debt/surplus threshold and the second instantaneous debt/surplus threshold, the method may proceed to step 830. At step 830, the vehicle indicator 88 may be displayed according to a second color state. If, however, the instantaneous debt/surplus value is not between the first instantaneous debt/surplus threshold and the second instantaneous debt/surplus threshold, the method may proceed to step 835.

At step 835, the instantaneous debt/surplus value may be compared to a third instantaneous debt/surplus threshold ($D/S_{3rd\_inst\_thr}$). The third instantaneous debt/surplus threshold may be a positive value (e.g., +21 Wh/mi) indicative of an instantaneous consumption rate that is greater than the budget threshold. If the instantaneous debt/surplus value is between the second instantaneous debt/surplus threshold and the third instantaneous debt/surplus threshold, the method may proceed to step 840. At step 840, the vehicle indicator 88 may be displayed according to a third color state. If, however, the instantaneous debt/surplus value is not between the second instantaneous debt/surplus threshold and the third instantaneous debt/surplus threshold, the method may proceed to step 845. At step 845, the instantaneous debt/surplus value may be compared to a fourth instantaneous debt/surplus threshold (D/S$_{4th\_inst\_thr}$). The fourth instantaneous debt/surplus threshold may be a positive value (e.g., +40 Wh/mi) indicative of an instantaneous consumption rate that is greater than the budget threshold by more than the third instantaneous debt/surplus threshold. If the instantaneous debt/surplus value is between the third instantaneous debt/surplus threshold and the fourth instantaneous debt/surplus threshold, the method may proceed to step 850. At step 850, the vehicle indicator 88 may be displayed according to a fourth color state. If, however, the instantaneous debt/surplus value is not between the third instantaneous debt/surplus threshold and the fourth instantaneous debt/surplus threshold, the method may proceed to step 855. At step 855, the system may determine that the instantaneous debt/surplus value is greater than the fourth instantaneous debt/surplus threshold. Accordingly, the vehicle indicator 88 may be displayed according to a fifth color state.

As shown in Table 1, the third color state may be associated with an instantaneous debt/surplus value between the second instantaneous debt/surplus threshold and the third instantaneous debt/surplus threshold. The range of values between the second instantaneous debt/surplus threshold and the third instantaneous debt/surplus threshold may only slightly affect the overall surplus, positively or negatively, if at all. Accordingly, for example, the third color state may correspond to a neutral state in which the vehicle indicator 88 is displayed. That is, the color of the vehicle indicator 88 may remain unaltered from its ordinarily displayed color. The neutral ordinary color associated with the vehicle indicator may be similar to the first color (e.g., blue) referenced above. Moreover, no additional display effects (e.g., halos or arrows) may be associated with the vehicle indicator 88 in the third color state.

As set forth above, the second color state may be associated with an instantaneous debt/surplus value between the first instantaneous debt/surplus threshold and the second instantaneous debt/surplus threshold. The range of values between the first instantaneous debt/surplus threshold and the second instantaneous debt/surplus threshold may moderately increase the overall surplus. Accordingly, the second color state may correspond to a "Surplus Increasing Level 1." As an example, in the second color state, the color of the vehicle indicator 88 may be slightly intensified from its neutral state, third color state. Additionally or alternatively, an outer border 112 of the vehicle indicator 88 may illuminate to give the vehicle indicator 88 the appearance of a halo.

As set forth above, the first color state may be associated with an instantaneous debt/surplus value that is less than the first instantaneous debt/surplus threshold. Values below the first instantaneous debt/surplus threshold may cause the overall surplus to increase even more than the range of values between the first instantaneous debt/surplus threshold and the second instantaneous debt/surplus threshold. Accordingly, the first color state may correspond to a "Surplus Increasing Level 2," indicative of an even more efficient instantaneous energy consumption rate relative to the budget threshold. As an example, in the first color state, the color of the vehicle indicator 88 may be intensified further than that of the second color state. Additionally or alternatively, the outer border 112 of the vehicle indicator 88 may illuminate with greater intensity as compared to the second color state.

As set forth above, the fourth color state may be associated with an instantaneous debt/surplus value between the third instantaneous debt/surplus threshold and the fourth instantaneous debt/surplus threshold. The range of values between the third instantaneous debt/surplus threshold and the fourth instantaneous debt/surplus threshold may moderately decrease the overall surplus. Accordingly, the fourth color state may correspond to a "Debt Increasing Level 1." As an example, in the fourth color state, the outer border 112 of the vehicle indicator 88 may begin to illuminate in a different color than that of the first and second color states to warn drivers of the relatively inefficient instantaneous consumption rate. For instance, the border 112 may slightly illuminate in the second color (e.g., yellow) to give the vehicle indicator 88 the appearance of a different halo. Moreover, the color fill of the vehicle indicator 88 may remain largely in its neutral state (e.g., blue).

As set forth above, the fifth color state may be associated with an instantaneous debt/surplus value that is greater than the fourth instantaneous debt/surplus threshold. Values above the fourth instantaneous debt/surplus threshold may cause the overall surplus to decrease even more than the range of values between the third instantaneous debt/surplus threshold and the fourth instantaneous debt/surplus threshold. Accordingly, the fifth color state may correspond to a "Debt Increasing Level 2," indicative of an even more inefficient instantaneous energy consumption rate relative to the budget threshold. As an example, in the fifth color state, the color fill of the vehicle indicator 88 may change from its neutral state (e.g., blue) to the second color (e.g., yellow). Additionally or alternatively, the outer border 112 of the vehicle indicator 88 may illuminate with greater intensity as compared to the fourth color state.

FIGS. 9*a-b* depicts an exemplary display 64' according to one or more alternate embodiments of the present application. As shown, the display 64' may include a battery gauge 68' having a first end 84' and a second end 86'. In the illustrated embodiment, the first end 84' may correspond to a lower battery charge limit for the main battery 26. The lower battery charge limit may signify that there is insufficient charge remaining in the main battery 26 to propel the vehicle 10. Thus, the first end 84' may correspond to a zero charge location. The second end 86' may correspond to an upper battery charge limit for the main battery 26 (e.g., maximum charge). Similar to FIGS. 2*a-5b*, the battery gauge 68' may include a SOC indicator 70' for indicating the state of charge of the main battery 26. The SOC indicator 70' and the first end 84' may define an SOC region 71'. The display 64' may further include a DTE indicator 72' and a DTT indicator 74'. Similar to FIGS. 2*a-5b*, the DTE indicator 72' and the DTT indicator 74' may be digital data readouts conveying their corresponding distance values numerically. Since the DTE value is associated with the state of charge of the main battery 26, the SOC indicator 70' and corresponding SOC region 71' may also provide a relative indication of the vehicle range.

The display 64' may also include a target indicator 92'. Rather than being displayed on a separate trip gauge, such as the trip gauge 80 in FIGS. 2*a-4b*, the target indicator 92' may be disposed along the battery gauge 68'. The position of the target indicator 92' relative to the SOC indicator 70' and the first end 84' may convey whether the vehicle 10 can reach its target location (e.g., a charge point) before the main battery 26 is depleted. For instance, if the target indicator 92' is between the SOC indicator 70' and the first end 84' corresponding to the zero charge location, as shown in FIG. 9*a*, then the main battery 26 may have sufficient energy to reach the target location under the current and/or predicted future operating conditions. Conversely, if the SOC indicator 70' is between the first end 84' and the target indicator 92', as shown in FIG. 9b, then the main battery 26 may be energy deficient with respect to reaching the target location.

The target indicator 92' may be a marker, icon or some other element identifying and indicating the target distance (e.g., the DTT value) relative to the vehicle range (e.g., the DTE value). As shown in FIG. 9a, positioning the target indicator 92' within the SOC region 71' may indicate that the target distance is less than the vehicle's current range. Thus, FIG. 9a may depict an energy surplus condition. On the other hand, positioning the target indicator 92' outside of the SOC region 71', as shown in FIG. 9b, may indicate that the target distance exceeds the vehicle's current range. Thus, FIG. 9b may depict an energy deficit or debt condition. According to one or more embodiments, the position of the target indicator relative to the first end 84' may provide a general indication of the amount of charge that may be required in order to reach the target location. Thus, the position of the target indicator 92' relative to the SOC indicator 70' may be indicative of the amount of surplus (or debt). Alternatively, in a surplus condition, the position of the target indicator 92' may generally convey a relative amount of remaining charge that may be available in the main battery 26 when the vehicle reaches the target location. To this end, the position of the target indicator 92' relative to the first end 84' may be indicative of the amount of surplus.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A battery gauge for a vehicle comprising:
    a first end associated with a lower battery charge limit;
    a second end associated with an upper battery charge limit;
    a state of charge (SOC) indicator disposed between the first end and the second end based on a battery SOC and; and
    a target indicator, associated with a target destination, disposed between the first end and the second end based on a target distance.

2. The battery gauge of claim 1, wherein the target distance corresponds to a distance between the vehicle and the target destination.

3. The battery gauge of claim 2, wherein a position of the SOC indicator relative to the first end corresponds to an estimated vehicle range.

4. The battery gauge of claim 3, wherein a position of the target indicator relative to the SOC indicator indicates the target distance from a current vehicle location to the target destination.

5. The battery gauge of claim 3, wherein a position of the target indicator relative to the first end indicates the target distance from a current vehicle location to the target destination.

6. The battery gauge of claim 3, wherein a position of the target indicator relative to the SOC indicator and the first end indicates whether the vehicle is currently able to reach the target destination based on the battery SOC.

7. The battery gauge of claim 6, wherein the target indicator is disposed between the SOC indicator and the first end when the estimated vehicle range exceeds the target distance indicating surplus battery energy exists for the vehicle to reach the target destination under current operating conditions.

8. The battery gauge of claim 7, wherein the position of the target indicator relative to the SOC indicator indicates a magnitude of the surplus battery energy.

9. The battery gauge of claim 6, wherein the SOC indicator is disposed between the first end and the target indicator when the target distance exceeds the estimated vehicle range indicating insufficient battery energy is available for the vehicle to reach the target destination under current operating conditions, the insufficient battery energy corresponding to an energy deficit.

10. The battery gauge of claim 9, wherein the position of the target indicator relative to the SOC indicator indicates a magnitude of the energy deficit.

11. A display control system for a vehicle comprising:
    a display including a battery gauge including a first end associated with a lower battery charge limit, a second end associated with an upper battery charge limit, a state of charge (SOC) indicator associated with a battery SOC and, and a target indicator associated with a target destination; and
    a controller in communication with the display and configured to:
        calculate an estimated vehicle range based at least upon the battery SOC;
        calculate a target distance based on a current vehicle location and the target destination; and
        output a signal causing the display to adjust a position of the target indicator relative to the SOC indicator based on the estimated vehicle range and the target distance.

12. The display control system of claim 11, wherein the position of the target indicator relative to the SOC indicator indicates the target distance from the current vehicle location to the target destination.

13. The display control system of claim 11, wherein the position of the target indicator relative to the first end indicates the target distance from a current vehicle location to the target destination.

14. The display control system of claim 11, wherein the target indicator is disposed between the SOC indicator and the first end when the estimated vehicle range exceeds the target distance indicating surplus battery energy exists for the vehicle to reach the target destination under current operating conditions.

15. The display control system of claim 14, wherein the position of the target indicator relative to the SOC indicator indicates a magnitude of the surplus battery energy.

16. The display control system of claim 11, wherein the SOC indicator is disposed between the first end and the target indicator when the target distance exceeds the estimated vehicle range indicating insufficient battery energy is available for the vehicle to reach the target destination under current operating conditions, the insufficient battery energy corresponding to an energy deficit.

17. The display control system of claim 16, wherein the position of the target indicator relative to the SOC indicator indicates a magnitude of the energy deficit.

18. A display method comprising:
    calculating a target distance based upon a current vehicle location and a target destination;
    calculating an estimated vehicle range based upon a battery state of charge (SOC); and
    displaying a battery gauge including a first end associated with a lower battery charge limit, a second end associated with an upper battery charge limit, a state of charge (SOC) indicator associated with a battery SOC, and a target indicator associated with the target destination and spaced apart from the SOC indicator based on the estimated vehicle range and the target distance.

19. The display method of claim 18, wherein the target indicator is disposed between the SOC indicator and the first end when the estimated vehicle range exceeds the target distance indicating surplus battery energy exists for the vehicle to reach the target destination under current operating conditions.

20. The display method of claim 18, wherein the SOC indicator is disposed between the first end and the target indicator when the target distance exceeds the estimated vehicle range indicating insufficient battery energy is available for the vehicle to reach the target destination under current operating conditions.

* * * * *